(12) United States Patent
Huang

(10) Patent No.: US 7,562,418 B2
(45) Date of Patent: Jul. 21, 2009

(54) HINGE MOUNTING APPARATUS

(75) Inventor: Guo-Ping Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 11/946,296

(22) Filed: Nov. 28, 2007

(65) Prior Publication Data

US 2008/0310085 A1 Dec. 18, 2008

(30) Foreign Application Priority Data

Jun. 13, 2007 (CN) .......................... 2007 1 0075032

(51) Int. Cl.
*E05D 5/00* (2006.01)
(52) U.S. Cl. .................... 16/382; 16/221; 16/DIG. 42; 29/760; 29/281.1
(58) Field of Classification Search ............ 16/254, 16/382, 221, DIG. 42; 379/433.13; 455/575.3; 227/26; 29/759, 760, 281.1, 281.5; 361/680–683
See application file for complete search history.

(56) References Cited

U.S. PATENT DOCUMENTS

| 4,872,603 | A | * | 10/1989 | Stearns ........................ 227/97 |
| 4,967,471 | A | * | 11/1990 | Noguchi et al. ............... 29/783 |
| 5,123,148 | A | * | 6/1992 | Ikeda et al. .................... 29/11 |

* cited by examiner

*Primary Examiner*—William L. Miller
(74) *Attorney, Agent, or Firm*—Steven M. Reiss

(57) ABSTRACT

A hinge mounting apparatus (100) for mounting a hinge (80) of a portable electronic device is provided. The portable electronic device includes an accommodating cavity (904). The hinge mounting apparatus includes a base (10), a hinge tube (50), an actuator (30), and a positioning member (60). The hinge tube is mounted on the base and includes a tube groove (504). The tube groove is configured for accommodating the hinge. The actuator is mounted on the base. The actuator includes a pressing head (3031) and configured to enable the pressing member to press the hinge into the accommodating cavity in a reciprocating manner. The positioning member is mounted on the base and is configured for positioning the portable electronic device in such a manner that the tube groove is essentially aligned with the accommodating cavity.

13 Claims, 7 Drawing Sheets

US 7,562,418 B2

HINGE MOUNTING APPARATUS

BACKGROUND OF THE INVENTION

1. Field of the Invention

The present invention relates to hinge mounting apparatuses, and particularly to an apparatus for mounting a hinge on a portable electronic device.

2. Description of Related Art

A portable electronic device (e.g., a mobile phone, a portable digital handset, or the like) is typically classified into three types, i.e., bar-type portable electronic device, flip-type portable electronic device, and foldable-type portable electronic device. The foldable-type portable electronic device typically contains a body and a cover. The cover is usefully coupled/connected by a hinge, whereby the cover can be operated relative to the body in a foldable manner.

In assembling/mounting the hinge on the foldable-type portable electronic device, the hinge is aligned with an accommodating space of the portable electronic device. The hinge is then manually inserted into the accommodating space and secured therein by an operator. The present mounting process is low efficient. In addition, the hinge requires to be interferingly engaged into the accommodating space, which may inevitably increase the operator's labor strength. In other words, the operator needs to use more strength in inserting the hinge into the accommodating space.

What is needed, therefore, is a hinge mounting apparatus that can overcome the above-mentioned shortcomings.

SUMMARY

In one aspect, a hinge mounting apparatus for mounting a hinge on a portable electronic device is provided. The portable electronic device includes an accommodating cavity. The hinge mounting apparatus includes a base, a hinge tube, an actuator, and a positioning member. The hinge tube is mounted on the base and includes a tube groove. The tube groove is configured for accommodating the hinge. The actuator is mounted on the base. The actuator includes a pressing head enabling the pressing member to press the hinge into the accommodating cavity in a reciprocating manner. The positioning member is mounted on the base and is configured for positioning the portable electronic device in such a manner that the tube groove is essentially aligned with the accommodating cavity.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

BRIEF DESCRIPTION OF THE DRAWINGS

Many aspects of a hinge mounting apparatus can be better understood with reference to the following drawings. These drawings are not necessarily drawn to scale, the emphasis instead being placed upon clearly illustrating the principles of the present apparatus for mounting a hinge. Moreover, in the drawings like reference numerals designate corresponding parts throughout the several views. Wherever possible, the same reference numbers are used throughout the drawings to refer to the same or like elements of an embodiment, and wherein.

DETAILED DESCRIPTION OF THE EMBODIMENTS

The present hinge mounting apparatus is described here in conjunction with the accompanying drawings in FIGS. 1-4. The apparatus is suitable in mounting a hinge on a portable electronic device, such as a mobile phone, a personal digital handset, or the like. The mobile phone is exemplified as an embodiment to be mounted with the hinge via the present hinge mounting apparatus.

Figure 1:
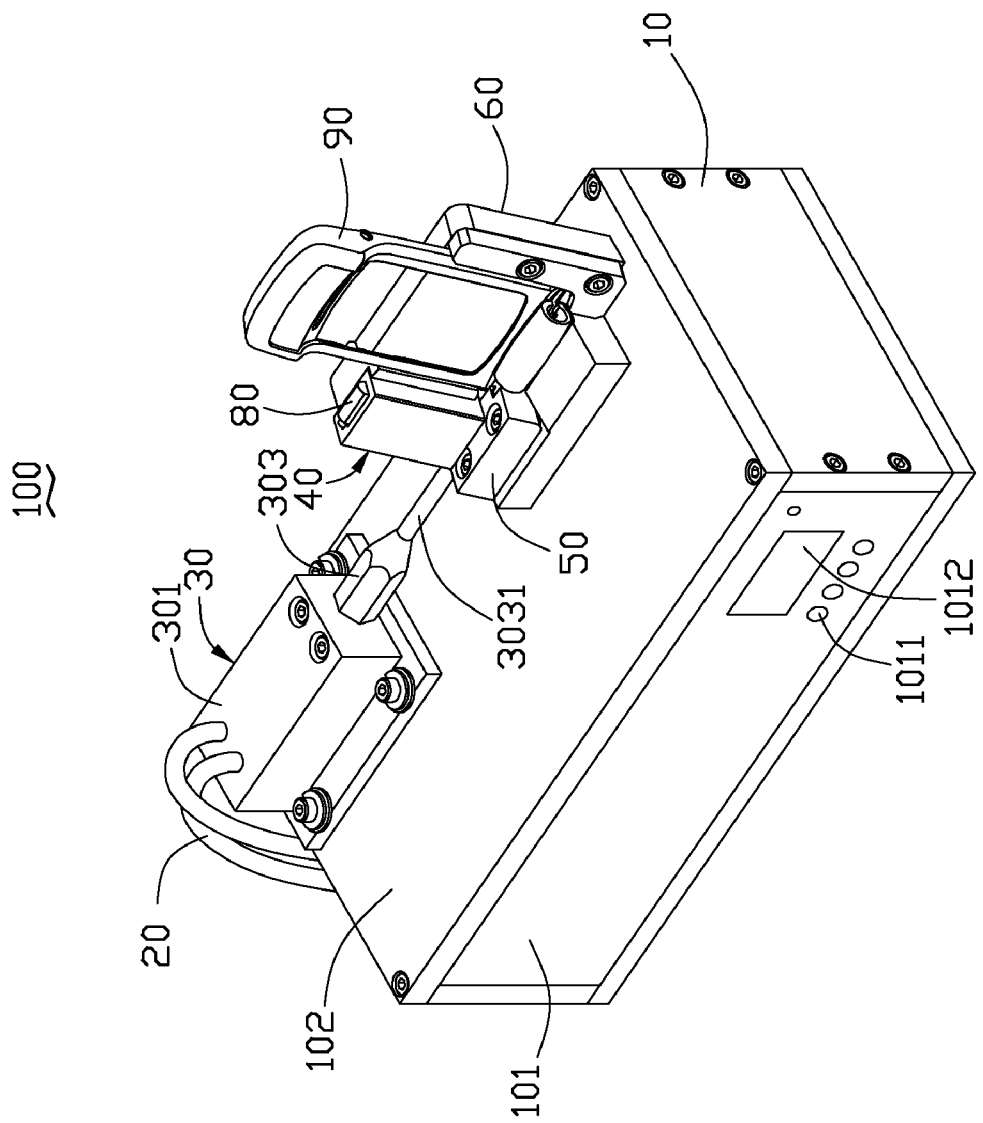
FIG. 1 is an isometric view of a hinge mounting apparatus in accordance with a present embodiment.

Referring now to FIG. 1, the hinge mounting apparatus 100 is used to mount a hinge 80 into a section 90 of the mobile phone. The section 90 of the mobile phone can be a cover portion of the mobile phone or a body portion of the mobile phone. The cover portion is rotably coupled to the body portion via the hinge 80.

Figure 2:
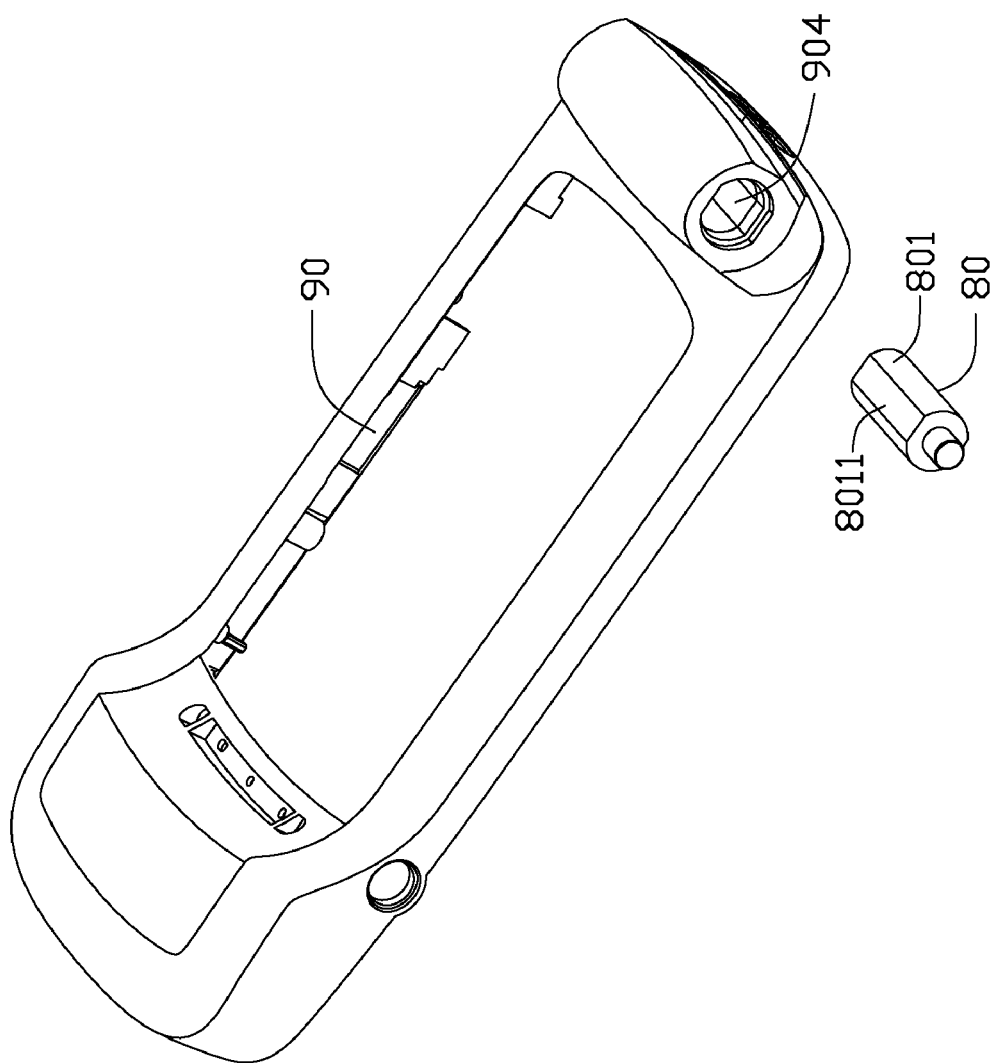
FIG. 2 is an isometric view of a section of a portable electronic device and a hinge shown in FIG. 1.
Figure 3:
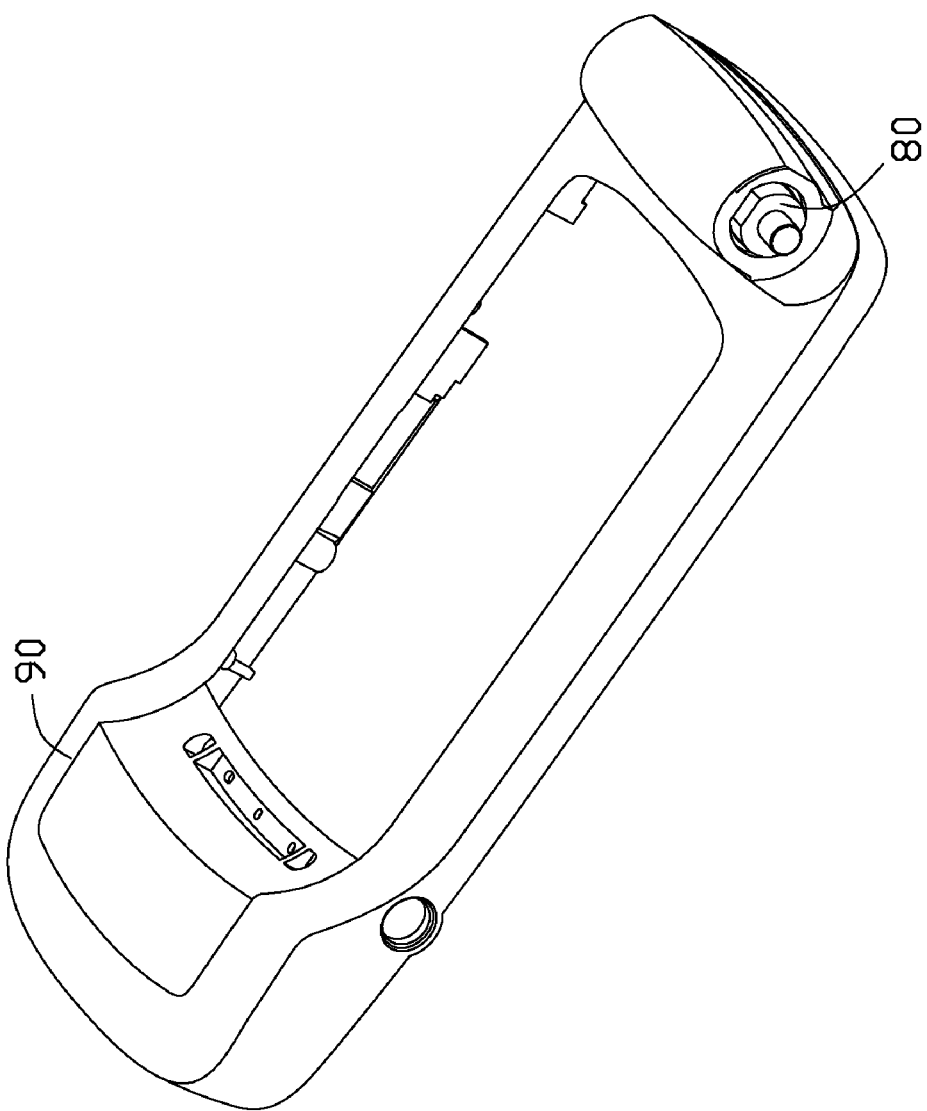
FIG. 3 is an assembled view of the section and the hinge shown in FIG. 2.

Referring also to FIG. 2, the hinge 80 includes a sleeve 801. The sleeve 801 has an engaging portion 8011 formed thereon. The section 90 of the mobile phone has an accommodating cavity 904 defined in an end portion thereof. The accommodating cavity 904 is configured (e.g., structured/arranged) to accommodate the hinge 80 therein with the engaging portion 8011 of the sleeve 801 engaging therein.

Referring back to FIG. 1, the hinge mounting apparatus 100 includes a base 10, a controller (not shown), a power generator (not shown), two pipes 20, an actuator 30, a hinge box 40, a hinge tube 50, and a positioning member 60. The controller is coupled/connected electrically to the power generator. The controller and the power generator are mounted in the base 10. The actuator 30 connects to the power generator via two pipes 20. The actuator 30, the hinge box 40, the hinge tube 50, and the positioning member 60 are respectively mounted on the base 10.

The base 10 includes a working platform 102 and a controlling panel 101. The working platform 102 is substantially planar which facilitates stably mounting the actuator 30, the hinge box 40, the hinge tube 50, and the positioning member 60.

The controlling panel 101 serves as a medium for facilitating interactive actions between operator and the hinge mounting apparatus 100. The controlling panel 101 includes a plurality of keys/buttons 1011 and a LCD display 1012. The plurality of keys/buttons 1011 is used to input commands to set total number of times of pressing the hinges 80 of the portable electronic device, value of the force of each pressing, frequency of the whole pressing, and etc. LCD display 1012 can display various kinds of information concerning with the hinge mounting apparatus 100 and mounting process thereof, such as the above inputted commands, the mounting results, or the like.

The controller can be MCU (Micro Control Unit), PLC (Programmable Logic Controller) or other control device that can perform functions of receiving controlling command sent from the user and outputting signals for controlling the power generator and the actuator 30. The power generator can be air supply and thus the connected pipes 20 are air pipes for carrying and transporting the air from the power generator to actuator 30.

The actuator 30 includes a pressing member 3031. The actuator 30 is such configured that it can be driven by the power generator to enable the pressing member 3031 to press the hinge 80 in a reciprocating manner. The actuator 30 is advantageously a pneumatic structure, which includes a cylinder 301 and a piston 303. The piston 303 is partially received in the cylinder 301 with a pressing member 3031 protruding outside. The piston 303 divides the cylinder 301 into two separate rooms. The two separate rooms of the cylinder 301 respectively connect to the power generator by one respective pipe 20. By means of altering relative pressure intensity between the two rooms, the piston 303 can slide in a reciprocating motion relative to the cylinder 301. The pressing member 3031 is advantageously soft, or coiled with a soft member such as rubber and etc. During mounting process, the pressing member 3031 presses forwardly against the hinges 80 and return adversely in one reciprocating motion of the piston 303. The soft feature of the pressing member 3031 can help prevent the hinges 80 from being damaged by the pressing member 3031.

Figure 4:
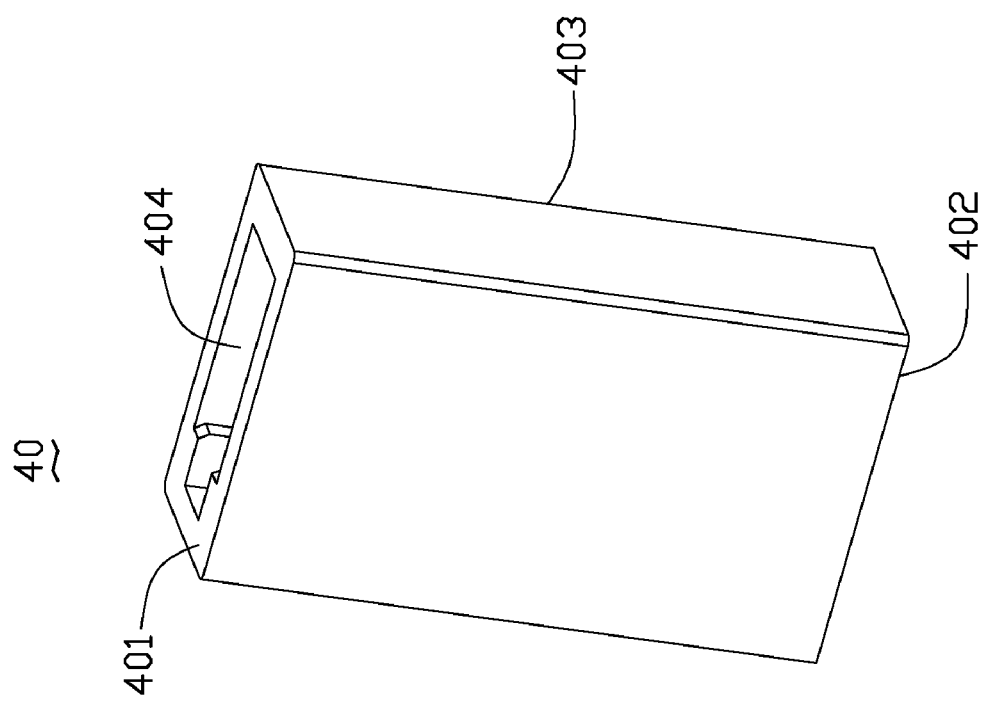
FIG. 4 is an enlarged, isometric view of a hinge box shown in FIG. 1.
Figure 5:
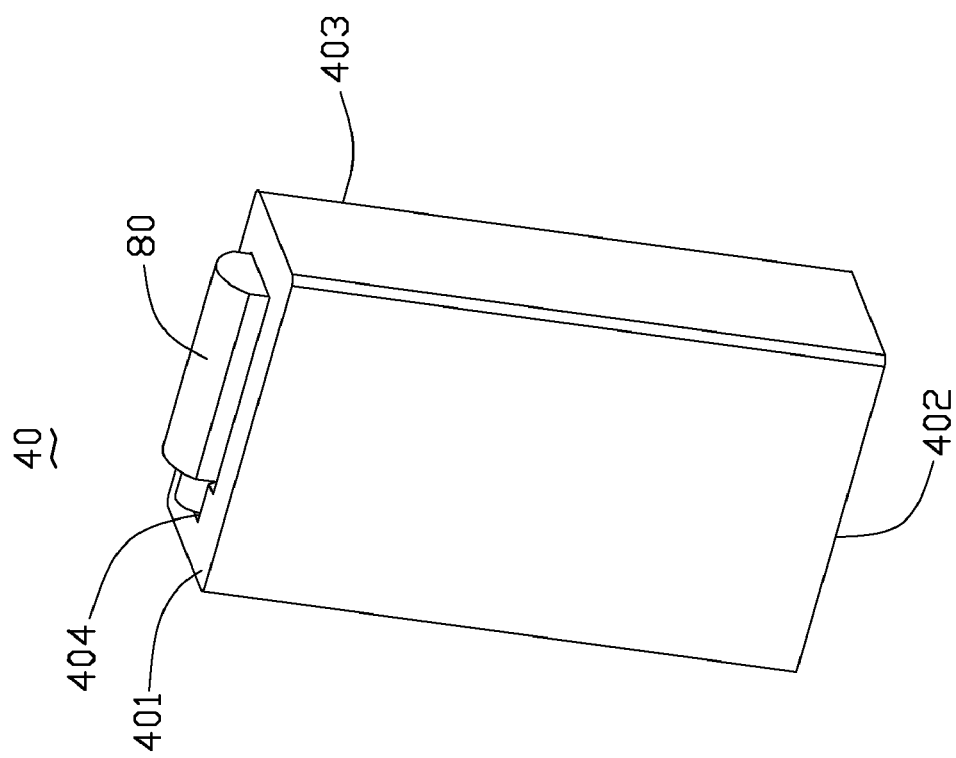
FIG. 5 is an enlarged, isometric view of the hinge box having a plurality of hinges stored therein shown in FIG. 1.

Referring also to FIGS. 4 and 5, the hinge box 40 of the hinge mounting apparatus 100 is used to store a plurality of hinges 80. The hinge box 40 is generally rectangular-shaped. The hinge box 40 includes an upper wall 401, a lower wall 402, a rear wall 403, a hinge groove 404, and at least one fixing hole (not shown). Two opposite ends of the rear wall 403 respectively connect with the upper wall 401 and the lower wall 402. The hinge groove 404 has an essentially same shape and size as that of the hinge 80. The hinge groove 404 is defined through the upper wall 401 and the lower wall 402. The plurality of hinges 80 is stored in the hinge groove 404 and can slide freely along the hinge groove 404. The at least one fixing hole of the hinge box 40 is defined in the rear wall 403 of the hinge box 40. The at least one fixing hole is advantageously screw hole. One respective screw (not shown) engaging into each fixing hole allows the hinge box 40 to be fixed on the positioning member 60.

Figure 6:
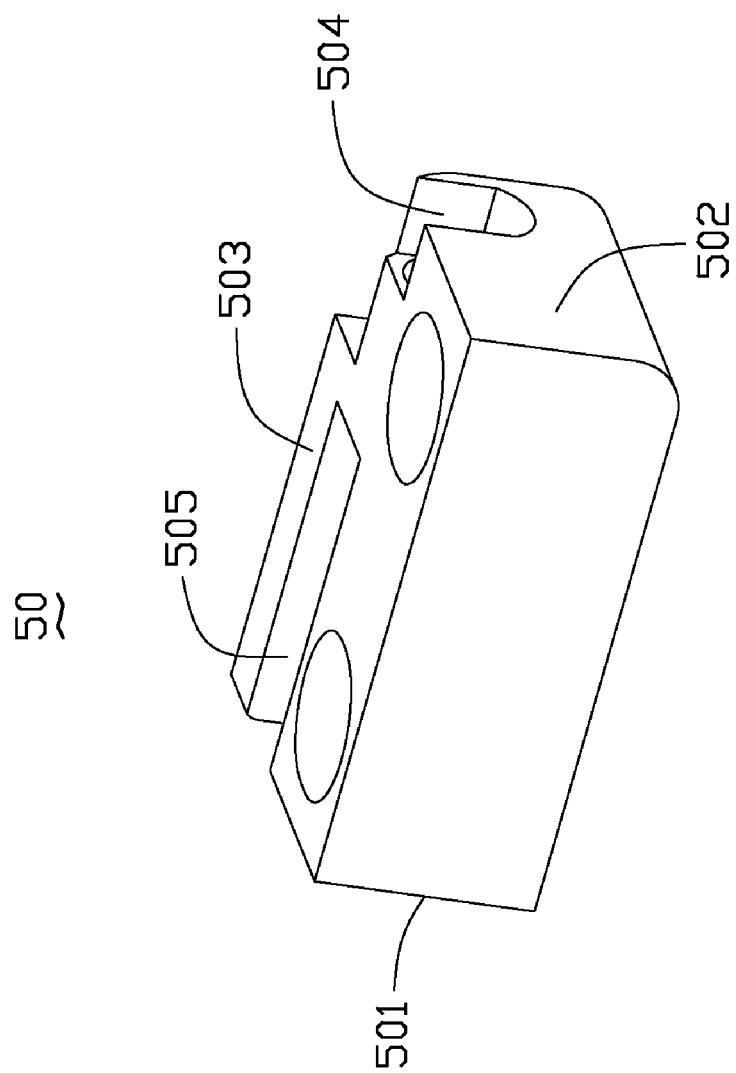
FIG. 6 is an enlarged, isometric view of a hinge tube shown in FIG. 1.

Referring also to FIG. 6, the hinge tube 50 is configured to receive the hinge 80 that is initially stored in the hinge box 40 and to allow the hinge 80 received in the hinge tube 50 to be pressed through the hinge tube 50. The hinge tube 50 is generally cubic-shaped and includes a left sidewall 501, a right sidewall 502, an upper wall 503, a tube groove 504, and an opening 505. Two opposite ends of the upper wall 503 respectively connect with the left sidewall 501 and the right sidewall 502. The tube groove 504 is configured to receive the hinge 80 for allowing the hinge 80 to slide freely along the tube groove 504. The tube groove 504 has an essentially same shape and size as that of the hinge 80. The tube groove 504 is defined through the left sidewall 501 and the right sidewall 502.

The opening 505 of the hinge tube 50 is defined in the upper wall 503 to such an extent that the opening 505 communicate with the tube groove 504. The opening 505 corresponds to the hinge groove 404 of the hinge box 40. In other words, the opening 505 is configured in such a manner that the hinge 80 can fall from the hinge groove 404 through the opening 505 to the hinge tube 50.

Figure 7:
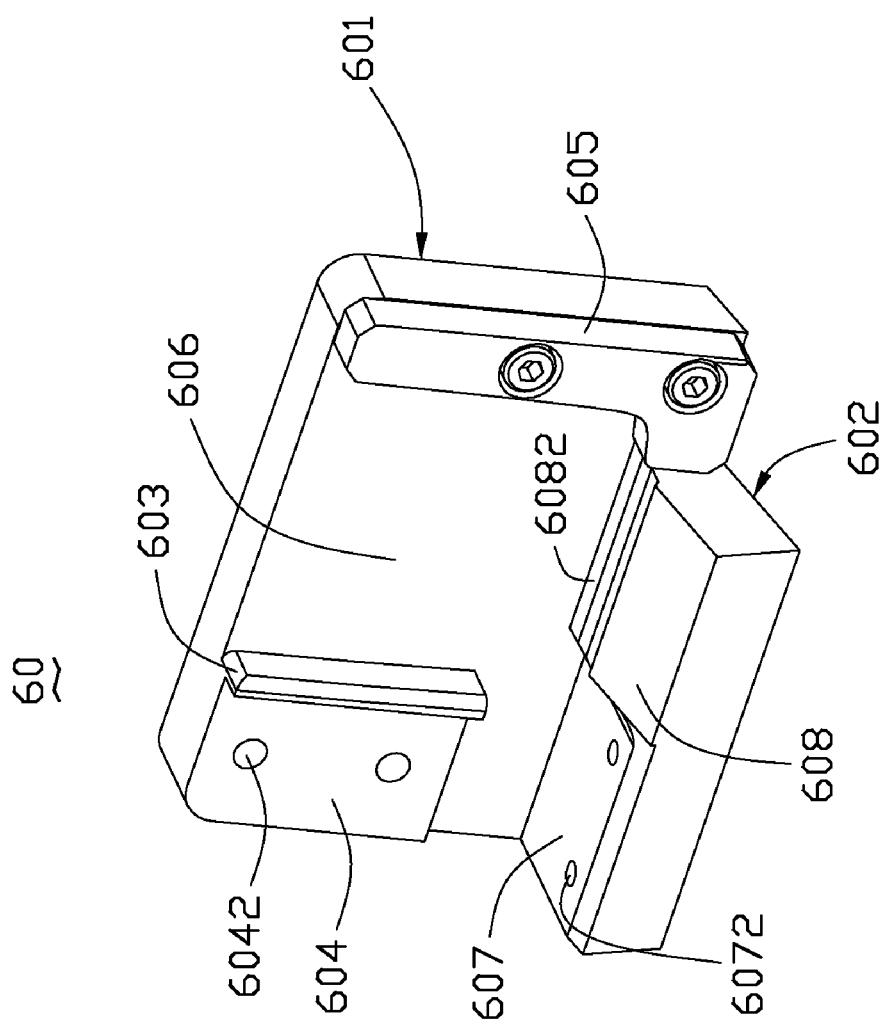
FIG. 7 is an enlarged, isometric view of a positioning member shown in FIG. 1.

Referring also to FIG. 7, the positioning member 60 has a general L-shaped cross section. The positioning member 60 includes a side board 601 and a base board 602. The side board 601 has a first rib portion 603 and a first mounting portion 604 formed thereon. The side board 601 further has a second rib portion 605 disposed thereon. In this embodiment, the second rib portion 605 is screwed with the side board 601. The first rib portion 603, the first mounting portion 604, the second rib portion 605, and the base board 602 are located at a same side of the side board 601. The first mounting portion 604 is disposed at an end of the side board 601 and corresponds to the hinge box 40 of the hinge mounting apparatus 100. The first mounting portion 604 has at least one fixing holes 6042 defined therein. The at least one fixing hole 6042 is advantageously a screw hole. One respective screw (not shown) engaging into each fixing hole 6042 allows the hinge box 40 to be fixed on the first mounting portion 604 of the positioning member 60. The first rib portion 603 is disposed proximate to the first mounting portion 604. The second rib portion 605 is disposed at an end of the side board 601.

The base board 602 of the positioning member 60 has a second mounting portion 607 and a supporting portion 608 formed thereon. The second mounting portion 607 is located below the first mounting portion 604. The second mounting portion 607 has at least one fixing holes 6072 defined therein. The at least one fixing hole 6072 is advantageously a screw hole. One respective screw (not labeled) engaging into each fixing hole 6072 allows the hinge tube 50 to be fixed on the second mounting portion 607 of the positioning member 60. The first and second mounting portions 604 and 607 are configured in such a manner that, when the hinge box 40 and the hinge tube 50 are respectively secured to the first and second mounting portions 604 and 607, the opening 505 of the hinge tube 50 is aligned essentially with the hinge groove 404 of the hinge box 40.

The supporting portion 608 includes a supporting wall 6082 formed thereon. The supporting portion 608 corresponds to an end wall of section 90 of the mobile phone and is used to support the section 90. The first rib portion 603 of the positioning member 60, the second rib portion 605 of the positioning member 60, and the supporting portion 608 cooperatively form a positioning groove 606. The positioning groove 606 is configured to have an essentially same shape and size as that of the mobile phone.

In assembly of the hinge mounting apparatus 100, the actuator 30 is secured to (e.g., screwed to) the working platform 102 of the base 10. The actuator 30 is connected to the power generator via the pipes 20. The hinge box 40 is screwed to the first mounting portion 604 of the positioning member 60. The hinge tube 50 is screwed to the second mounting portion 607 of the positioning member 60. In this case, the opening 505 of the hinge tube 50 is aligned with the hinge groove 404 of the hinge box 40. The positioning member 60 combined with the hinge box 40 and the hinge tube 50 is secured to the working platform 102. At this time, the pressing member 3031 of the actuator 30 is aligned essentially with the tube groove 504 of the hinge tube 50.

Before operating the hinge mounting apparatus 100, a plurality of hinges 80 are placed into the hinge box 40 one by one. The first placed hinge 80 slides through the hinge groove 404 of the hinge box 40 and the opening 505 of the hinge tube 50 into the tube groove 504 of the hinge tube 50. The section 90 of the mobile phone is supported by the supporting wall 6082 of the positioning member 60 and positioned in the positioning groove 606 of the positioning member 60. In this case, the accommodating cavity 904 is aligned with the hinge tube 50.

After that, the hinge mounting apparatus 100 works to mount the hinge 80 on the section 90 of the mobile phone. The piston 303 of the actuator 30 is driven by the power generator to move toward the hinge 80 accommodated in the tube groove 504. The pressing member 3031 of the piston 303 presses and inserts the hinge 80 to pass through the tube groove 504 into the accommodating cavity 904 of the section 90 of the mobile phone. When the hinge 80 is totally received in the accommodating cavity 904, the piston 303 is driven by the power generator to return to its original position. Then, the section 90 of the mobile phone mounted with the hinge 80 is replaced with another section 90 of another mobile phone. As such, another hinge 80 falls from the hinge box 40 to the tube groove 504 of the hinge tube 50. In this case, the hinge mounting apparatus 100 can perform another mounting process, i.e., another hinge 80 is mounted to another section 90 of another mobile phone. The whole mounting process results in high efficiency. Moreover, operator's labor strength is decreased because the operator is merely required to replace the section 90 of the mobile phone mounted with the hinge 80 with another section 90 of another mobile phone.

In another embodiment, the second mounting portion 607 of the base board 602 of the positioning member 60 can be omitted. The hinge tube 50 is configured in such a manner that, when the hinge tube 50 is mounted (e.g., screwed) on the working platform 102 of the base 10, the tube groove 504 of the hinge tube 50 is aligned with the pressing head of the actuator 30 and the accommodating cavity 904 of the section 90 of the mobile phone.

In further embodiment, the hinge box 40 can be omitted. Thus, during the mounting process, the hinge 80 is manually placed into the tube groove 504 of the hinge tube 50.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge mounting apparatus for mounting a hinge on a portable electronic device, the portable electronic device including an accommodating cavity, the hinge mounting apparatus comprising:
   a base;
   a hinge tube mounted on the base, comprising a tube groove configured for accommodating the hinge;
   an actuator mounted on the base, comprising a pressing member, the actuator configured to enable the pressing member to press the hinge into the accommodating cavity in a reciprocating manner; and
   a positioning member mounted on the base, the positioning member configured for positioning the portable electronic device in such a manner that the tube groove is essentially aligned with the accommodating cavity.

2. The hinge mounting apparatus as claimed in claim 1, further comprising a hinge box configured to store a plurality of hinges and transport a hinge to the hinge tube, and the hinge box is mounted on the positioning member.

3. The hinge mounting apparatus as claimed in claim 2, wherein the hinge box has a hinge groove defined therethrough, the hinge groove configured to have essentially the same size and shape as that of the hinge.

4. The hinge mounting apparatus as claimed in claim 3, wherein the hinge tube has an opening defined therein, the opening being configured to align with the hinge groove and to communicate with the hinge groove.

5. The hinge mounting apparatus as claimed in claim 4, wherein the opening communicates with the tube groove.

6. The hinge mounting apparatus as claimed in claim 1, wherein the actuator includes a cylinder and a piston, the pressing member is formed on an end of the piston, and the piston is partially received in the cylinder with the pressing member protruding outside.

7. The hinge mounting apparatus as claimed in claim 6, wherein the pressing member is soft, or coiled with a soft member.

8. The hinge mounting apparatus as claimed in claim 1, wherein the hinge tube is configured to have essentially the same size and shape as that of the hinge.

9. The hinge mounting apparatus as claimed in claim 1, wherein the positioning member comprising a base board, a side board, and a positioning groove, the base board is mounted on the base, and the positioning groove is configured to have essentially the same shape and size as that of the portable electronic device.

10. The hinge mounting apparatus as claimed in claim 9, wherein the side board has a first rib portion formed thereon and has a second rib portion disposed thereon, the base board includes a supporting potion, and the first rib portion, the second rib portion, and the supporting portion cooperatively form the positioning groove.

11. The hinge mounting apparatus as claimed in claim 10, wherein the supporting portion includes a supporting wall, and the supporting wall is configured to support the portable electronic device.

12. The hinge mounting apparatus as claimed in claim 9, wherein the side board has a first mounting portion formed thereon, the hinge mounting apparatus further comprising a hinge box, and the hinge box is mounted on the first mounting portion.

13. The hinge mounting apparatus as claimed in claim 12, wherein the base board of the positioning member has a second mounting portion formed thereon, the second mounting portion is located below the first mounting portion, and the hinge tube is mounted on the second mounting portion.

* * * * *